Sept. 15, 1970      N. ROSENSTEIN      3,529,045

METHOD FOR CONTROLLING ROLL DIAMETER

Filed May 4, 1965      7 Sheets-Sheet 1

INVENTOR.
Nathan Rosenstein,
BY
Paul & Paul
ATTORNEYS.

Sept. 15, 1970 N. ROSENSTEIN 3,529,045
METHOD FOR CONTROLLING ROLL DIAMETER
Filed May 4, 1965 7 Sheets-Sheet 3

INVENTOR.
Nathan Rosenstein,
BY Paul & Paul
ATTORNEYS.

FIG_9_

FIG_10_

United States Patent Office 3,529,045
Patented Sept. 15, 1970

3,529,045
METHOD FOR CONTROLLING ROLL DIAMETER
Nathan Rosenstein, West Hartford, Conn., assignor to Spunize Company of America, Inc., a corporation of Connecticut
Filed May 4, 1965, Ser. No. 453,128
Int. Cl. B29b 1/08
U.S. Cl. 264—40                          3 Claims

ABSTRACT OF THE DISCLOSURE

Means are provided for controlling the diameter of rolls, particularly when the rolls are disposed in pairs defining a nip therebetween, during rotation. Undesirable roll diameter variations are controlled by desirably maintaining the temperature gradient between an internal portion of the roll and the roll surface, and by adding or subtracting heat from the roll surface, as desired.

---

This invention relates to method and apparatus for the control of the diameter of calender and press rolls and the like.

More particularly this invention is concerned with the control of roll diameter whereby line tangency throughout the nip can be maintained during operation, even at high roll temperatures.

In widely varied fields where rolls of the type described are used, including the production of films or sheets of rubber, plastic, paper, etc., and in certain textile processes such as those involving filamentary material, it is important and often critical to maintain roll uniformity, and especially line tangency throughout the nip.

The failure to eliminate differences in roll diameter, in adjacent rolls, normally recognized by warping or bowing of the rolls, creates a condition of non-tangency at the nip, a condition which often produces deleterious results. This has long been a problem, for example, in calendering rubber or plastic sheeting at relatively high temperatures, where very small differences in roll diameter across the face of the roll produce undesirable variations in the thickness of the rubber or plastic being calendered.

In the past, several different attempts have been made to overcome the problem of non-linearity in rolls of the present type. Thus, rolls having pre-set crowned or concave configurations have been produced. However, these have not proved entirely satisfactory, primarily because the particular shape selected, while correct for rolling one composition, is incorrect for rolling the same composition to a different thickness or a different composition to the same thickness.

More recently, it has been suggested that differences in roll diameter are a result of temperature differentials between the center and the end portions of the roll. See, for example, U.S. Pat. 2,933,760, which is primarily concerned with rolls for the production of sheet rubber and plastic.

While the above patent recognizes the importance of thermally caused stresses, the theory which it sets forth does not accurately identify the true causative relationship between thermal conditions and non-linearity in rolls, nor does the process and aparatus disclosed therein necessarily prevent non-linearity.

In contrast to the above, I have discovered that the diameter at any given point of a calendar roll is a function of the differential, at such point, between the internal and surface temperature of the roll. More explicitly, I have found that the diameter of a roll at a given cross-section is determined by the temperature gradient along the radius defining the section.

Thus, for example, if a roll warps and develops a pinch in one portion and a bowing out in an adjacent portion, this is due to the existence of different temperature gradients along the radii defining such adjacent points.

In accordance with my discovery, therefore, I have found that a constant diameter throughout the length of a roll can be obtained by maintaining the same temperature gradient along every radial cross-section of the roll. Thus, for example, if a roll is $x$ inches in diameter and $y$ represents a selected radial distance inward from the surface, the roll will have a uniform diameter at a given instant in time if the surface temperature is uniform and if all interior points of the roll lying at $y$ are at a uniform temperature. In other words, uniformity exists if $Tx1-Ky1=Tx2-Ky2$, where T and K are constant (but not necessarily the same) temperatures, where $x1$ and $x2$ are different points on the roll surface, and where $y1$ and $y2$ are points lying the same distance from the surface along radii originating at $x1$ and $x2$, respectively.

In connection with the above, it is to be understood that the temperatures T and K may be the same or they may be different, and that the equation permits T and K to vary in time. Thus, either or both temperatures may change provided that the differential between T and K at $x1$, $y1$ and $x2$, $y2$ is the same at any given instant.

Finally, since temperature gradients are involved, $y$ may be arbitrarily selected distance, it will be understood, therefore, that the measurement of roll interior temperature for purposes of this invention may be taken at any distance from the roll surface.

Thus, I have discovered a comprehensive method of maintaining linearity in a calender roll and the like, which method includes the steps of measuring continuously the surface temperature of the roll, measuring continuously the temperature of the interior of the roll, and adjusting the surface and/or internal temperatures to maintain such temperatures at a fixed relationship with respect to each other.

The comprehensive method stated above is subject to modification in certain specialized situations. As will be more specifically discussed below, for example, it is possible to design rolls so that the interior temperature thereof can be maintained substantially constant by circulating a constant temperature heat transfer medium, e.g. liquid, through the interior. Within certain ranges, therefore, the presence of external influences which tend to add or subtract heat from the roll surface will not affect the interior temperature of the roll. (Of course, the particular temperature range will vary with the specific construction of the roll and other factors.) With this type of roll, therefore, it is possible to eliminate the measurement of interior temperature. This is particularly the case where the extremely precise control afforded by the comprehensive method is not necessary. Of course, rolls of this type may be equipped with means for measuring interior temperature so that the comprehensive method may be practiced, if desired.

As a further modification, it has also been found in specific uses of rolls of the type referred to in the preceding paragraph that the rate of surface temperature variation is directly proportional to the speed at which the rolls rotate. In this particular situation, therefore, it is also possible to eliminate measurement of roll surface temperature, and to control the adjustment of surface temperature in proportion to roll speed. In the following, for brevity's sake, this modification of my comprehensive method is sometimes referred to as the "ratio control" method.

Accordingly, it is an object of this invention to provide methods, and apparatus for performing the methods, whereby diameter differentials in calender rolls and the like can be eliminated, thereby insuring line tangency throughout the nip of the rolls during actual production.

In the detailed description which follows, I have elected to illustrate initially a preferred embodiment of apparatus for performing the ratio control method of my invention and thereafter illustrate two embodiments of apparatus for performing the comprehensive method, i.e., where surface and interior temperature is constantly monitored.

For convenience, each embodiment of the apparatus of my invention is illustrated as applied to rolls for crimping yarn. Notwithstanding the particular context of this illustration however, it is to be emphasized that the invention is applicable to rolls used in a wide variety of arts and not merely those relating to textile processing, and that in the claims appended hereto, I do not intend to be limited to the textile arts.

Turning now to the drawings, which illustrate specific forms of the invention as applied to multiple-end crimpers, but do not limit the scope of the invention as defined in the appended claims:

As indicated, the illustrated embodiments of my invention relate to multiple-end crimpers and methods, particularly to apparatus and method for controlling the uniformity of crimp of filamentary textile material.

The term "filamentary textile material" as used herein is intended to cover synthetic or natural (proteinaceous) filaments broadly, and in forms such as yarns, tows for staple and fiber conversion and fabrics made of such yarns, for example. In one form, in which the invention has proved itself highly advantageous, the filaments were present as a plurality of substantially parallel ends of yarn. In all forms, the filaments are crimped by rollers in a common compression area.

As examples of existing crimpers for handling multiple ends of yarn in a common chamber, reference is made to the patent to Rosenstein et al. No. 2,715,309, Suggs No. 2,860,400 and Cocker No. 3,067,480. In all of the crimpers shown therein, varying degrees of crimp non-uniformity have been encountered, particularly where the crimp rolls are of hollow cylindrical construction, but sometimes even with solid crimp rolls. Actually, hollow rolls have been found by me to be particularly advantageous, because they can be heated internally in order concurrently to crimp and heat-set the yarns, as is disclosed and claimed in my co-pending U.S. application Ser. No. 154,577, filed Nov. 24, 1961 and now abandoned.

Uniformity of crimp is vital commercially because, for one reason, different degrees of crimp respond differently to the same dye solution, thus necessarily producing color variations from one yarn end to another. Such variations show up as defective streaks in carpets or fabrics made up of such yarns, and give rise to tremendously costly waste due to failure to meet specifications. Crimp variation also causes other non-uniformities, variations and defects in finished products which are made up of many ends of yarn.

It is difficult to detect non-uniformity of rolls, particularly because serious crimp variations can be caused by exceedingly small concave or convex roll distortions. For example, a warping of about 3 millionths of an inch for a 7-inch diameter roll with 6-inch length is sufficient to cause serious crimp variations. Moreover, the crimp rolls can be essentially perfect when no filaments are being run through, but become defective when the operation is begun. For example, visual inspection, by aiming a light from one side to the nip, and sighting from the opposite side, may well show no light-crack, indicating full tangency from roll end to roll end. But then, when the cold filaments (particularly yarns or tows) are run through, a thermal effect is created and has been found to deform one or both rolls enough to produce a defective crimped filamentary product, but this condition is then difficult to detect by sighting because the presence of the filaments interferes with sighting and the filaments are already separating the rolls, further interfering with the test. Cold filament feed is not the only causative factor; this effect may even be observed if the filaments are pre-heated as they are conducted toward the nip.

It has been discovered, after running non-uniform yarns and testing and proving them non-uniform, that if the crimper is shut down and the yarns are removed from between the rolls, the rolls do show a non-tangency when subjected to light-beam inspection. This non-tangency can occur in either direction, concave or convex.

Accordingly, it is another object of this invention to overcome the foregoing disadvantages, and to produce multiple textile filaments all of which are essentially uniform as to degree of crimp.

After much research in the fields of metallurgy and precision grinding, it has been discovered that the foregoing problems could not be solved in such fields. On the contrary, as previously discussed, it has been discovered that strong thermally-induced stresses are involved and that excellent filament uniformity is achieved by the use of the method of my invention which in one form includes controllably supplying external heat from outside the rolls, which heat provides thermal stress relief on these rolls and compensates for the lack of tangency, producing a pair of straight, parallel stress-relieved rolls having uniform line contact with essentially equal pressure from end to end, even while many cold filaments are being run continuously between the rolls. This discovery is of great importance because the production of truly uniform filaments, particularly yarns or tows, is thereby made possible.

Turning now to one of the specific forms of the invention selected for illustration in the drawings, it will be appreciated that although specific forms of the invention have been selected and will be described in specific terms for the sake of clarity, such terms are intended only to apply to the specific articles and structures shown in the drawings and are not intended to limit the scope of the invention as claimed. Although yarn in multiple ends has been selected as the filamentary material, the invention applies as well to a single end of yarn or to tows or fabrics, for example.

Figure 1:
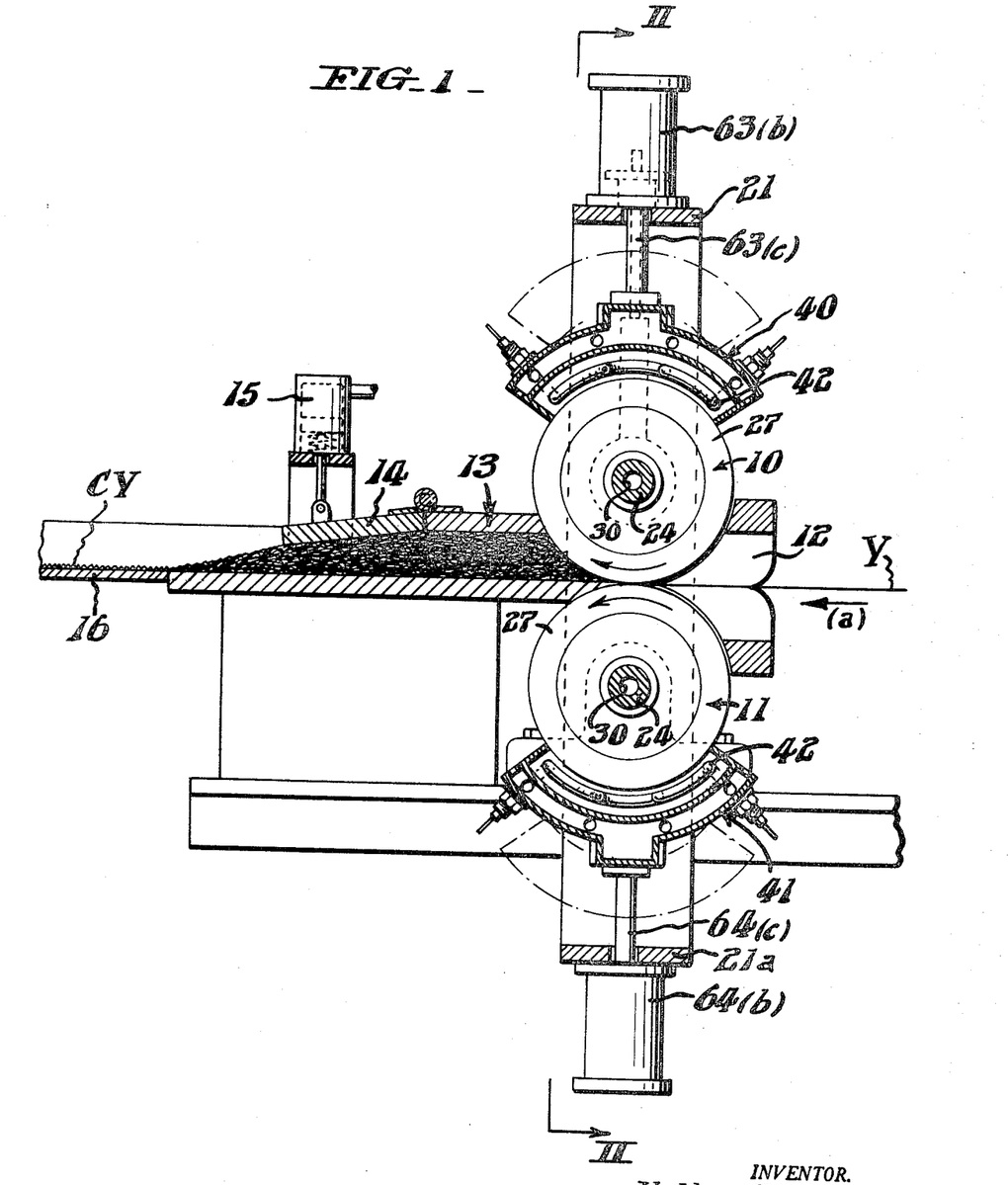
FIG. 1 is a view in side elevation, partly in section, showing one form of crimping apparatus constructed in accordance with this invention for crimping multiple ends of yarn.
Figure 2:
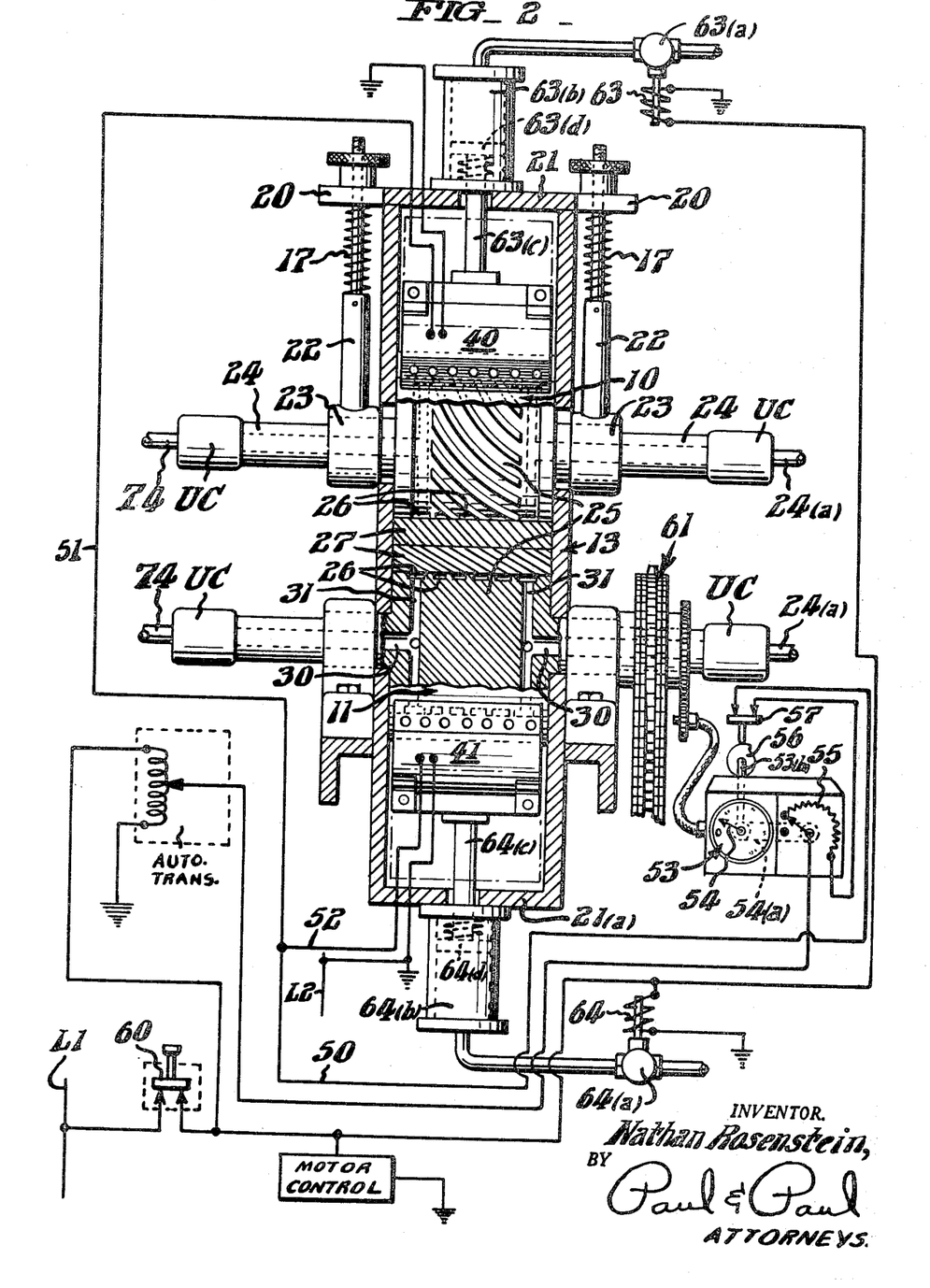
FIG. 2 is a sectional view taken as indicated by the lines and arrows II—II which appear in FIG. 1, with certain parts further broken away and shown in section in order more clearly to reveal important details.

Referring particularly to FIGS. 1 and 2, the crimper there shown includes a pair of crimp rolls 10, 11 which are power driven and urged together to form a nip for the yarn Y which moves in the direction indicated by the arrow (a). Yarn Y is guided by a lease divider 12 which conforms to the shape of the rolls and separates the individual yarn ends one from the other. It will be appreciated that a large number of ends, for example one hundred or more, may be conducted separately through individual divider portions of the lease divider, as is now known in the art and disclosed in the aforementioned patent to Suggs, for example. Just downstream of the rolls 10, 11 is a stuffing chamber 13 having a door 14 and a pneumatically actuated cylinder 15 constructed to press the door against the mass of yarn contained within the chamber. The number 16 designates a tray located downstream of the chamber 13, preferably arranged generally horizontally, for carrying the crimped yarn CY away from the chamber.

As will be observed in FIG. 2, the roll 10 is urged downwardly against the roll 11 by means of compression springs 17, 17 which are effective at their upper ends upon the ears 20 of a crossplate 21 spaced above the top of the upper roll 10. At their lower ends, the compression springs 17, 17 bear upon sleeves 22 connected to bearings 23 on the drive shaft 24 of upper roll 10.

Coupled to the drive shafts 24 by universal coupling UC are pipes 24(a) and 74 which carry a heating fluid such as hot oil or the like, for heating the rolls in a manner further to be described.

As is shown in FIG. 2, each roll 10, 11 is hollow, having a fluted inner core 25 forming void spaces 26 inside an outer shell 27, for flow of hot oil or other heating liquid. Also, each cylinder is provided with inlet and outlet passages 30 and connecting passages 31 for circulation of hot liquid through and around the inner spaces 26. Thus, means are provided for internally heating the cylinders 10, 11 and particularly their outer shells 27 from within.

The pipes 24(a) are connected to a liquid heater and a circulating pump which of themselves are conventional and are not shown; their use in a crimper is disclosed in the aforementioned copending patent application Ser. No. 154,577.

As is shown in FIGS. 1 and 2, externally arranged heaters 40, 41 are located adjacent to the outer surfaces of the crimp rolls to supply external heat to the surfaces of the shells 27, from outside. As shown, each heater 40, 41 is arcuate in shape, is hollow and includes electric heating elements 42. Obviously, various other shapes and forms of heaters may be substituted.

As shown in FIGS. 1 and 2 of the drawings, each heater 40, 41 is mounted on a shaft 63(c), 64(c) which in turn is connected to a piston 63(d), 64(d) of a cylinder 63(b), 64(b) mounted on the crossplates 21, 21(a). Electric means, shown by supply lines $L_1$ and $L_2$, the latter connected to "ground," are provided for heating the upper and lower heaters 40, 41 respectively by way of conductors 50, 51 and 52.

In the form of the apparatus shown in FIGS. 1 and 2, the rate of addition of heat by way of the heaters 40, 41 is controlled in response to the speed of movement of the yarns through the rolls, which in turn is proportional to the speed of rotation of the rolls 10, 11 themselves. This is accomplished by means of a tachometer 53 geared to the main drive shaft of roll 11, having an indicator 54 connected by driving means 54(a) to a resistor 55 which is connected into the heater supply circuit. Thus, as the speed of the lower roll 11 changes, the setting of the rheostat or resistance of resistor 55 also changes, thus changing the electric current flowing to the heaters and therefore the heat supplied externally to the rollers 10, 11, all in proportion to the rate of speed of movement on the yarn itself. It will be observed that the tachometer 53 has a speed-responsive shaft 54(b) which is connected to a cam 56 which is set, at a predetermined crawl speed just above zero speed, to release a switch 57 thus opening the entire heating circuit and cutting off the heaters 40, 41 completely whenever the speed of revolution of the crimp rolls approaches zero. This protects against uneven heating or crimping when an end of yarn breaks or when the crimping machine must be shut down for any other reason.

The number 60 designates an on-off switch for the entire apparatus which is connected to operate the motor (not shown) which drives the main drive 61 of the crimper. Solenoids 63, 64 are connected to operate normally open pneumatic valves 63(a), 64(a) which are connected to cylinders 63(b), 64(b) having shafts 63(c), 64(c) connected respectively to the heaters 40, 41. These cylinders 63(b, 64(b) have spring return pistons 63(d), 64(d) connected to draw the heaters away from the associated rolls, against the cross plates 21 and 21(a) which serve as stops.

In FIGS. 1 and 2, it will be observed that the rolls 10, 11 though provided with flow channels for the hot oil, are nevertheless relatively massive. This fact, together with the fairly substantial volume of hot oil or other heating medium passing therethrough means that the heat storage capacity for the rolls as a whole is quite large. This is emphasized for the reason that the internal temperature of the rolls in this type of roll design is substantially constant by reason of the large mass of material of the rolls and the absence of any changing rate of transfer of heat to cause any material change in the interior temperatures of the rolls 10 and 11. The situation is quite different, however, in respect to the exterior surface portions of the rolls since, as already explained, the passage of the yarns through the nip and their delivery to the chamber 13 represents a continuous flow of heat away from the rolls in the region of the nip. The rolls are maintained at elevated temperature which may run as high as 300° F. or more and the purpose of the high temperature, selected for the particular synthetic material used for the yarns, is for the purpose of producing not only the crimping, but also a flattening and reshaping of the yarn which frequently is supplied in circular cross-section. Added to the foregoing transfer of heat is the fact that the yarns may be at room temperature and thus represent a relatively cool stream of yarns passing through the crimping rolls and this further increases the removal of heat from the outer surface portion of the rolls 10 and 11. As indicated above, this differential of temperature as between the surface portions of the rolls and the internal portions thereof can lead to different temperature gradients in adjacent portions of the roll which, in turn, gives rise to thermally produced mechanical stresses which can cause the rolls to take on the barrel shape of FIG. 3 or the concave contour of FIG. 4. However, since the interior temperature remains constant and the cooling effect on the exterior of the rolls varies with the speed of the rolls, for a given loading, it will be seen that by controlling the heaters 40 and 41 in accordance with the speed of the rolls, there will be automatically compensated the loss of heat and thus the exterior temperatures of the rolls will be maintained at a close approximation to the interior temperature thereof.

The operation of the apparatus shown in FIGS. 1 and 2 will accordingly be apparent. When a plurality of ends of yarn are inserted through the lease reed 12 and into the nip between the rolls, and when the apparatus is energized and the main drive 61 is started, the crimper rolls revolve thus forcing the yarn into the stuffing chamber 13 causing the yarn to buckle and fold and therefore to form a multiplicity of V-shaped crimps. Similarly, the external heaters 40, 41 are automatically energized by the closing of the on-off switch 60, and the rate at which heat is supplied is governed by the tachometer 53 in a manner proportional to the rate of rotation of the crimping rollers 10, 11. Thus, the tendency of the rolls to warp because of thermally induced stresses is eliminated by the thermal stress relief obtained by the action of the external heaters 40, 41 thereby preserving substantially uniform and complete tangency at the nip between the rolls from one end of the nip to the other.

If for any reason the yarn speed should increase, the heating rate is correspondingly increased to compensate for the additional heat transferred to and carried away to the stuffer chamber by the yarns, thus maintaining a substantially steady thermal relief effect and maintaining the rolls in a tangent condition from edge to edge, at the nip. Similarly, in the event that the speed of the rolls should decrease, a corresponding decrease is automatically made in the heat supplied externally. In the event that an end should break or that, for any other reason, the operator determines to turn off the on-off switch 60, then the electric current to the heaters is broken and the solenoid springs automatically retract the heater to the maximum distance away from their corresponding rolls.

It will be appreciated that the internal heating of the rolls by means of circulating hot fluids such as oil or the like may be maintained substantially constant. It may also be controlled in direct relationship to the control of the heat supplied to the external heaters. Thus, the heater for heating the oil itself may be connected directly into the rheostat 55 for that purpose. However the controls are arranged, it is important to maintain a definite, controlled relation between the temperatures at the outside and the inside of the cylinder shell.

It will be appreciated, accordingly, that where all other factors which tend to cause non-tangency of rolls are maintained constant, then the tendency toward non-tangency can be compensated for directly in proportion to the rate of speed of the yarn. Such other factors include but are not limited to total denier introduced, ambient temperature, humidity, finish applied to the surface of the yarn, and the type of yarn used, i.e. nylon or polypropylene, for example.

Figure 3:
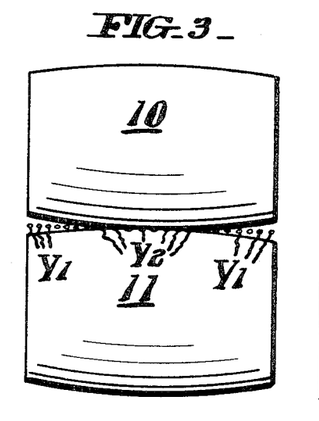
FIGS. 3, 4 and 5 are schematic views in exaggerated form, looking toward the nips of the crimping rolls, and illustrating respectively rolls which are convex, and concave and tangent.
Figure 4:
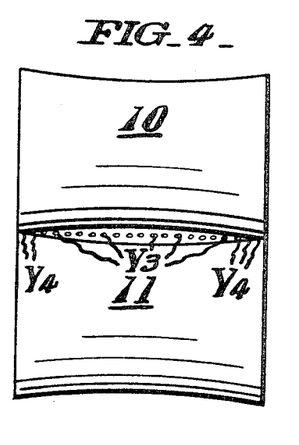
Figure 5:
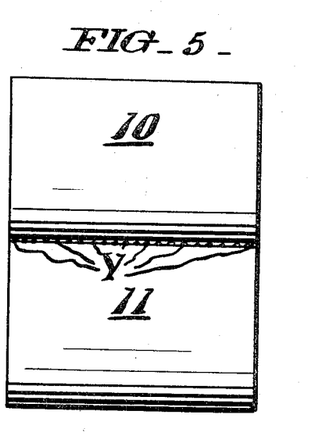
Figure 6:
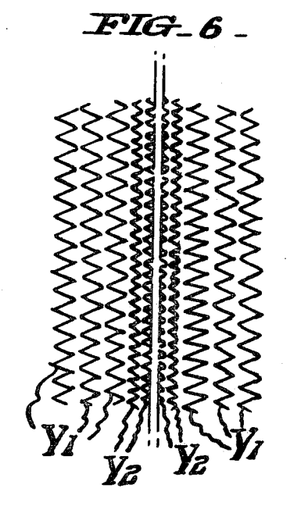
FIGS. 6, 7 and 8 are plan views of fragments of crimped yarn webs produced respectively by the rolls shown in FIGS. 3, 4 and 5.
Figure 7:
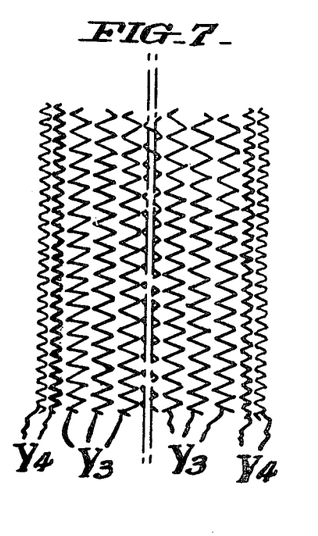
Figure 8:
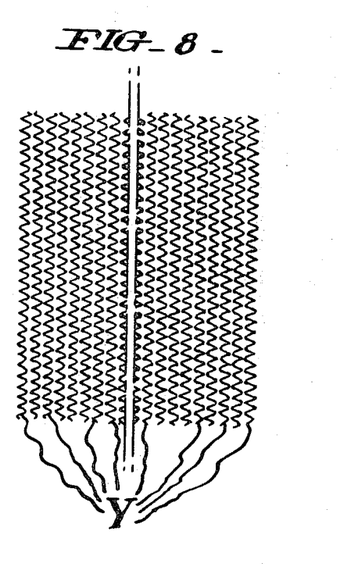

Turning now to FIGS. 3–8 of the drawings, the effects experienced due to faulty temperature balance are seen. It will be appreciated that under some thermal conditions the pair of rolls 10, 11 may become convex with respect to one another as shown in FIG. 3. This produces an effect where the crimps of the edgemost yarns $Y_1$ in FIG. 6 consist of large V-shaped crimps while the crimps of portions $Y_2$, $Y_2$ near the center of the rolls are much tighter. The opposite occurs in FIGS. 4 and 7, where the thermal conditions are such that the rolls are concave with respect to one another, producing a large, open crimp at the yarns $Y_3$, $Y_3$ in the center and tight crimps in the yarns $Y_4$, $Y_4$ at the edges. FIGS. 5 and 8 show the effect of the controlled relationship between surface and interior temperature of the crimp rolls provided in accordance with this invention, wherein the thermal stress-relieving produces a straight-line nip; the rolls are substantially tangent to one another at any cross-section taken in any plane along the nip. FIG. 8 shows the uniformity of the yarn Y that is thus achieved.

Figure 9:
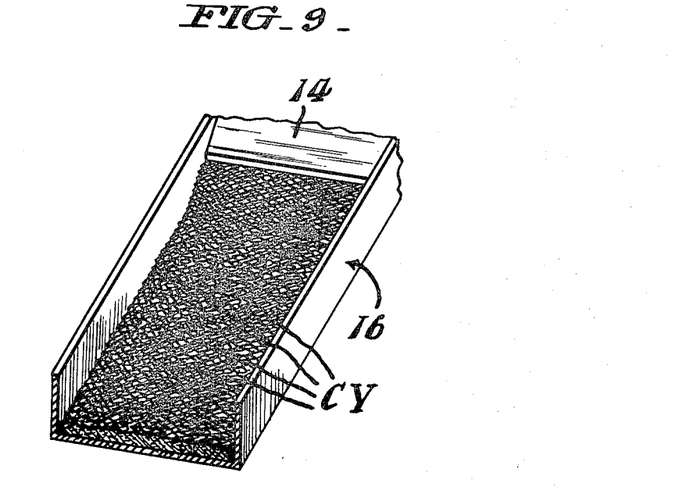
FIG. 9 is a view in perspective of a portion of a yarn collecting tray, showing the appearance of the crimped yarn as produced by a crimper having uniform, tangent rolls.
Figure 10:
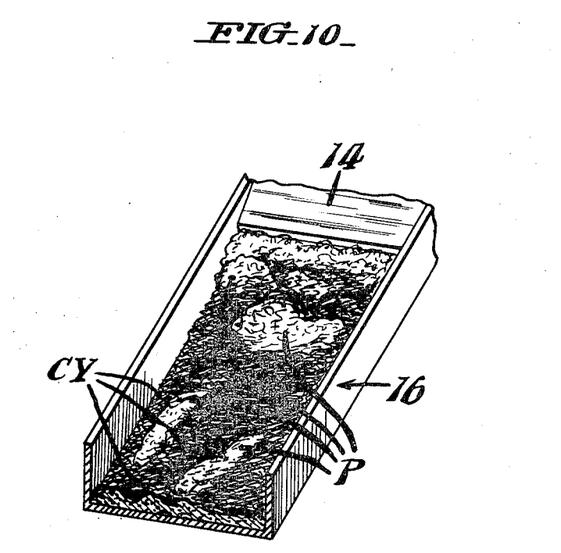
FIG. 10 is a view similar to FIG. 9, showing the appearance of the yarn when the rolls are non-tangent or non-uniform.

The operator of the apparatus may readily control the amount of heat provided, by visual inspection of the yarn as it passes away from the crimper along the trough 16. As is shown in FIG. 9, when the correct amount of external heat has been provided by the heaters 40, 41, the individual ends of yarn Y as carried on the trough 16 are all of equal crimp and tend to lie smoothly and in a flat plane in the bottom of the trough 16. By way of contrast, as shown in FIG. 10, when certain portions of the yarn are crimped more than others, the loosely crimped portions tend to form into lumpy puffs P as shown in FIG. 10. The locations of these puffs and their sizes convey to the operator the fact that a defective nip exists and indicates whether the defect is of the concave or convex type, thus enabling the operator to determine whether to increase or decrease the heat externally supplied.

Figure 11:
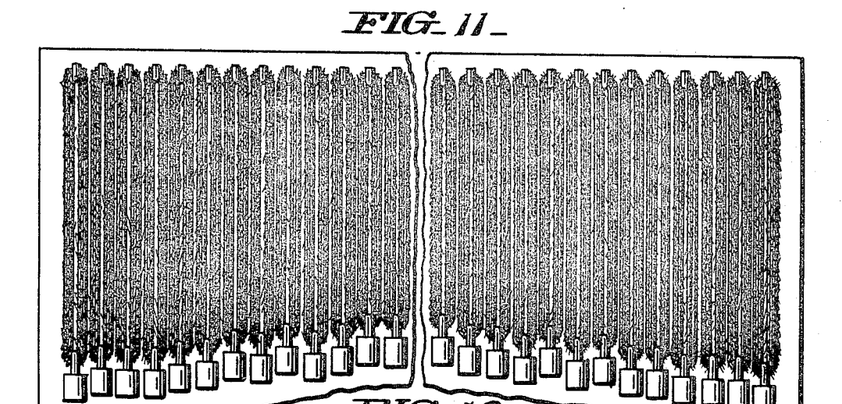
FIG. 11 is a view in elevation, with the central portion broken away, showing various ends of yarn hanging on a crimp tester, illustrating a form of non-uniformity that is caused by relatively convex crimping rolls.
Figure 12:
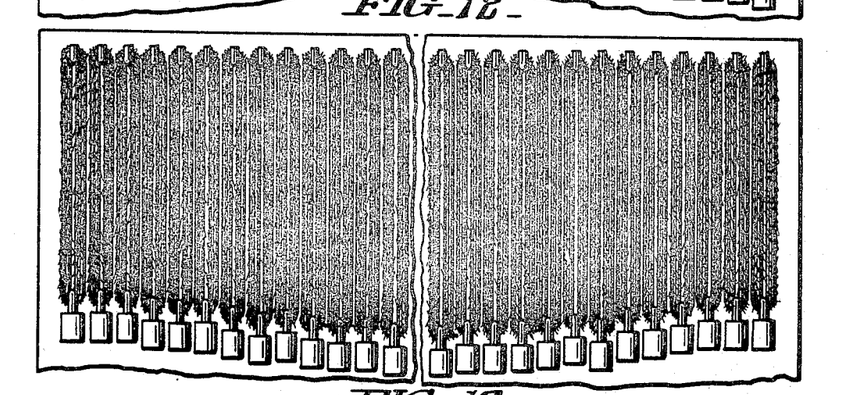
FIG. 12 is a view similar to FIG. 11, showing the non-uniformity caused by relatively concave crimping rolls.
Figure 13:
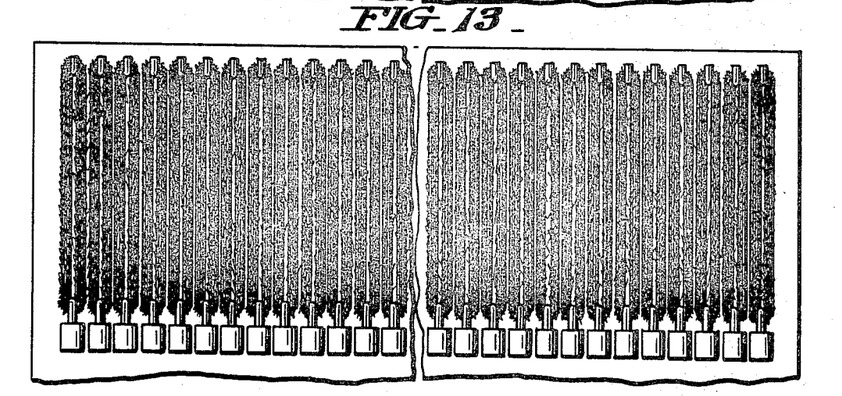
FIG. 13 is a view similar to FIGS. 11 and 12, illustrating the crimped uniformity that is attained when the rolls are tangent.

Referring to FIGS. 11, 12 and 13 of the drawings, these show the results of standardized yarn crimp tests and illustrate the effectiveness of this invention as applied to actual yarns. In accordance with such standard yarn crimp tests, each end of yarn is separated and its separate identity is maintained. Thirty yards of yarn (thirty loops of one yard each, for example) from each portion was wound on a creel to obtain uniform skeins. These skeins of yarn were then hung on pegs with a uniform predetermined weight on each skein. The same procedure was followed with each of the (ninety three) ends of yarn concurrently crimped in the same chamber, and all such yarns were hung side by side as shown. FIG. 11 shows the results of convex crimp rollers such as those in FIG. 3, wherein the centermost yarns have a much tighter crimp and therefore provide much shorter weighted loops in accordance with the crimp test. The outermost yarns are seen to have a much looser crimp. Similarly, FIG. 12 shows the product obtained when the crimp rolls are concave as shown in FIGS. 4 and 7, while FIG. 13 corresponds to FIGS. 5 and 8 and shows the uniformity that can be and is obtained in accordance with this invention.

Figure 14:
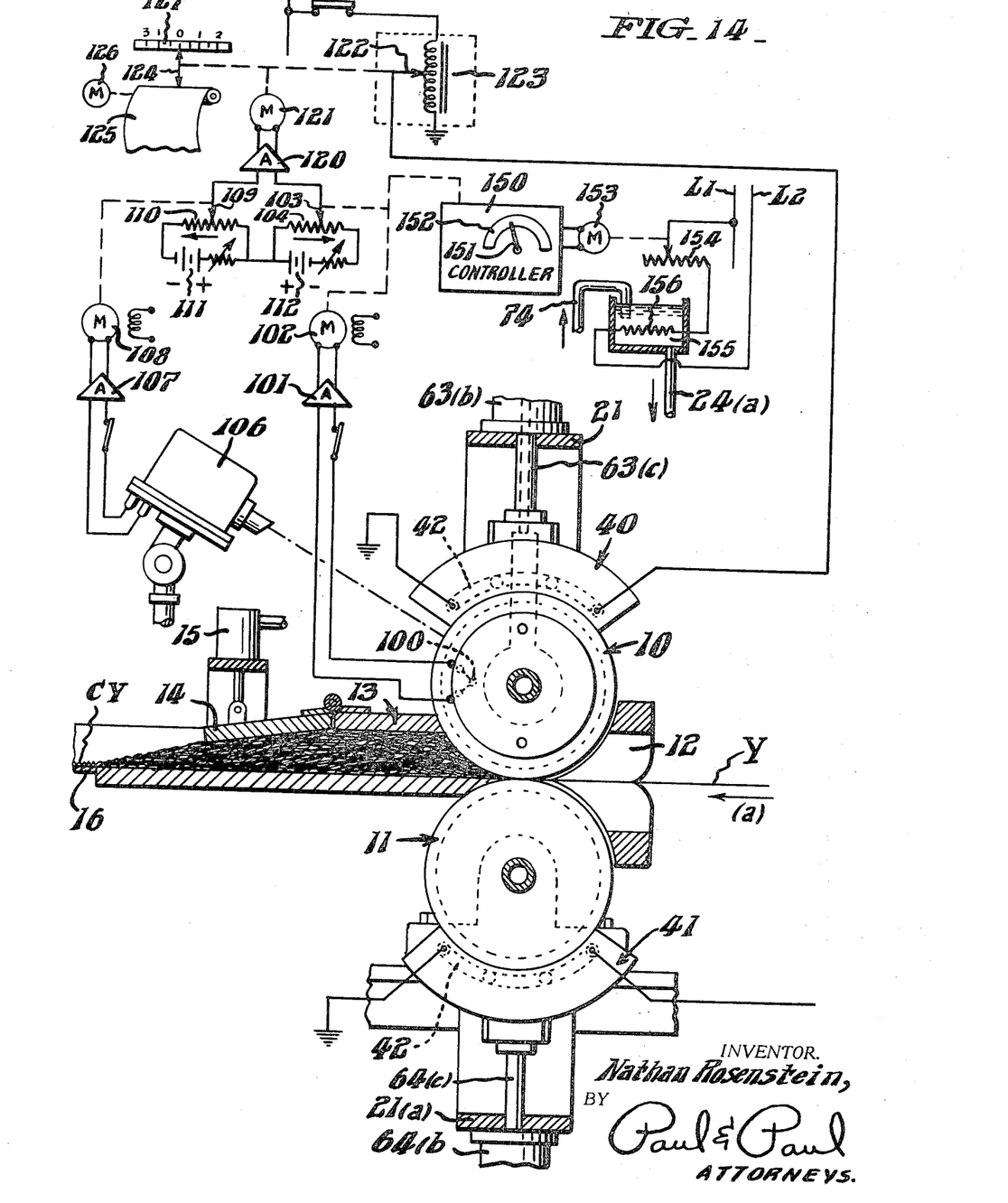
FIG. 14 is a view similar to FIG. 1, illustrating a modified form of apparatus embodying principles according to this invention.
Figure 15:
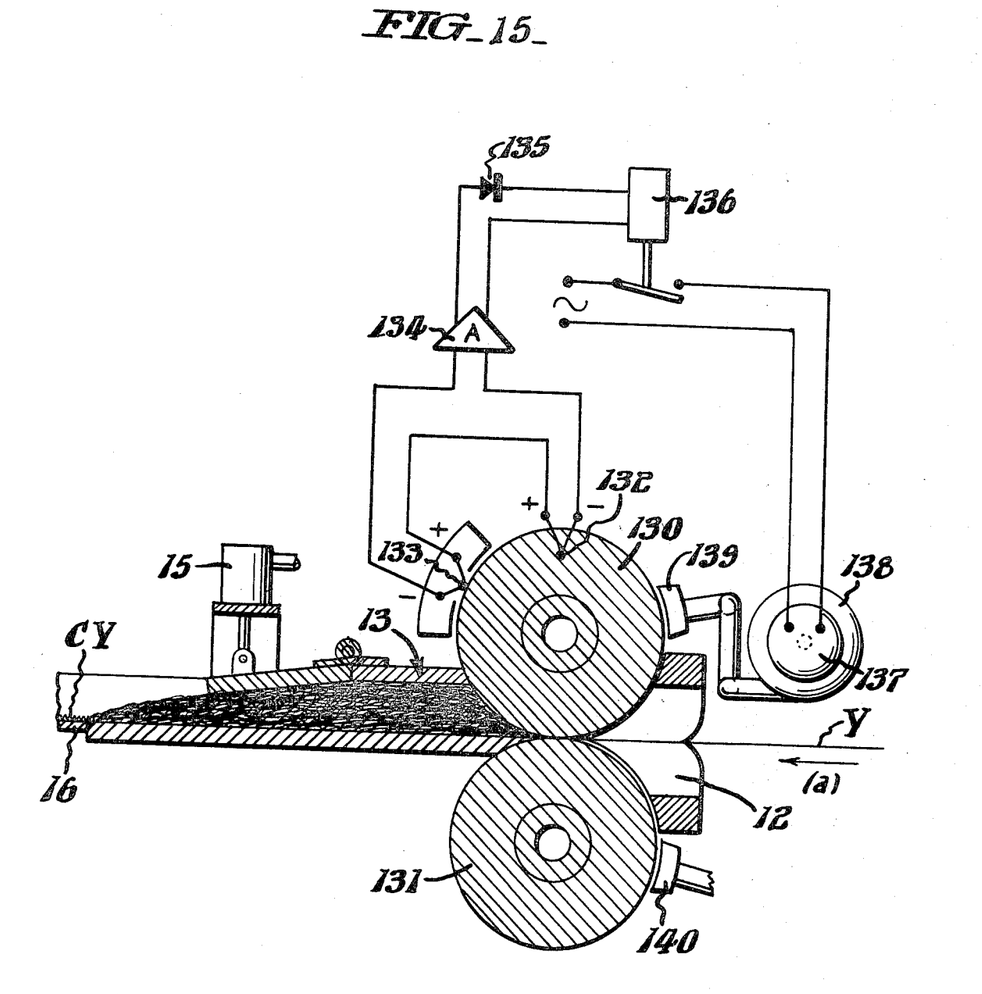
FIG. 15 is another view similar to FIGS. 1 and 14, showing still another modification.

As indicated, the apparatus of FIG. 2 is suitable for performing the ratio control method which I have discovered. In FIGS. 14 and 15, however, there is illustrated more sophisticated apparatus capable of operating according to the more precise comprehensive method which I have invented. Thus, there is provided means for sensing and adjusting the surface and interior temperatures of the rolls 10 shown in FIGS. 14 and 15, and it will be understood that rolls 11 in each case are similarly equipped. In both of the embodiments shown in FIGS. 14 and 15, moreover, the particular means shown are for maintaining the interior and surface temperatures of the rolls equal. Of course, the means shown could be adjusted to maintain other uniform temperature gradients, if desired.

Referring now to FIG. 14, the rolls 10 and 11 are of the same construction as more fully illustrated and described in connection with FIGS. 1 and 2. That is to say that they are provided with channels for internal heating, though indeed electrical heaters could be used for this purpose in lieu of the hot oil or other heating medium. In any event, there is provided a temperature measuring means shown as a thermocouple 100 disposed for the measurement of the internal temperature of the roll 10. This temperature responsive means may be inserted in the oil discharged from roll 10 or it may be disposed in a suitable cavity provided in the roll and which terminates near the inner wall of the outer shell of the roll. The thermocouple 100 is connected to an amplifier 101 arranged to energize a motor 102 to position a contact 103 of a potentiometer 104 is the temperature of the interior of the roll changes. The amplifier 101 and the motor 102 form parts of a temperature measuring system, such for example as utilized in modern electronic measuring recorders, an example of which may be found in Williams Pat. 2,113,164 and of which there are many now available on the market for producing rotation of the shaft in response to change in temperature.

In order to measure the exterior temperature of the roll 10, there is provided an optical pyrometer 106 which may be of the thermopile type sighted on the exterior surface and having an output applied to an amplifier 107 for energization of a motor 108 to position the contact 109 of a second potentiometer circuit 110. It will be observed that the batteries 111 and 112 of the potentiometer circuits are oppositely poled so that the voltage appearing between the contacts 103 and 104 will be proportional to the difference between the interior and exterior temperatures of the roll 10. Thus, there will be an input to an amplifier 120 only in the event that the temperature of the exterior surface of the roll 10 differs from, for example is less than, the temperature of the interior portion of the roll. When that occurs, the amplifier 120 energizes a motor 121 which adjusts the contact 122 of the autotransformer 123 to increase the energization of the heater 40. As the temperature difference is reduced to zero the motor 121 restores the contact 122 to its original position. If desired, the motor 121 may also position a pen-index 124 to record on a chart 125 driven by motor 126 the difference between the interior and exterior temperatures and which difference may likewise be read from a scale 127 shown as having a zero center.

It is to be understood that the system of FIG. 14 is shown in elementary form and is intended only to be illustrative of more sophisticated systems which may be used in order closely to regulate the exterior temperature to maintain it in a fixed relationship (e.g., equal) to the interior temperature. Obviously, instead of relying solely upon change in energization of the exterior heater, one can utilize the output of motor 121 to increase the rate of circulation of the heating medium through the heater, or to add heat to that medium to provide a greater outward flow of heat to the exterior surface. In general, however, it is preferred to utilize the direct control of the external heating surface by the control of the energization of the heater 40.

For even greater precision of control the shaft-output of motor 102 may be applied to a controller 150 which includes a knob 151 for setting a pointer to the desired temperature on scale 152 which set-temperature is to be maintained constant within the roll 10. When there is variation from the set-temperature, a motor 153 is energized to adjust a rheostat 154 to change the heating current from lines $L_1$ and $L_2$ for the heater 156 provided for the hot oil bath 155 circulated through roll 10 by way of pipes 24(a) and 74. The adjustment of rheostat 154 is to be taken as a symbolic representation of any suitable adjustment of the heat input means for the heating medium and also for the control of the rate of flow of the hot heating medium.

As mentioned, roll 11 of FIG. 14 is equipped in the same manner as roll 10. Accordingly, by use of the control systems described above, the surface and interior temperatures of the rolls 10, 11 may be maintained equal, or at another selected fixed relationship to insure continued line tangency throughout the length of the nip.

Further in connection with the phrase "line tangency throughout the length of the nip," it is to be understood that this phase is defined as the condition which would obtain if the rollers are adjusted until the roller 10 is just in contact with the roller 11. Since at least the operative portions of the rollers are cylindrical and in geometrical terms may be considered to be surfaces of revolution with the generatrix of the surface a straight line, it will be understood that when the cylinders 10 and 11 just touch each other, there is a line contact common to both of the cylinders. When the cylinders are slightly separated at the nip for the crimping of the yarns, it will be understood that these lines, one in each cylinder, are to remain parallel one to the other and are to continue to be straight lines instead of curvilinear lines as earlier indicated showing the deviation to convex or the concave form, depending upon the direction of the thermally induced mechanical stresses which cause the difficulty and result in variations in the crimping to the detriment of the final product.

In certain types of crimping, solid rolls are provided instead of the hollow-type illustrated in FIGS. 1, 2 and 14. Such a crimping system has been illustrated in FIG. 15 where the rolls 130 and 131 are shown as solid in cross-section mounted on their respective shafts, the other parts being the same as illustrated in FIGS. 1 and 2. Where the rolls are solid, the effect of the work done in crimping the yarn and transferring the yarn through the rolls gives rise to a heating effect rather than a cooling effect. Accordingly, a difference in temperature between the interior and exterior arises by reason of a temperature rise of the exterior surfaces of the rolls.

In order to avoid warping, etc., caused by uneven differentials between surface and interior temperature at adjacent portions of the roll, it is necessary to monitor the surface and interior temperatures of the rolls, as indicated in connection with FIG. 3.

In crimping certain types of yarn, it is often desirable or necessary to maintain the roll surfaces at relatively low temperatures, e.g., at room temperature or thereabout. Where solid rolls are used, it is thus necessary to provide means whereby the roll surfaces may be cooled, as is illustrated in FIG. 15 in connection with roll 130. It will be understood that roll 131 is similarly equipped.

Though this may be done in accordance with the tachometer arrangement of FIG. 2, i.e. to vary the cooling in proportion to the speed, and hence with the load and the amount of work done which causes the temperature rise, the needed cooling may also be accomplished by providing internal and external thermocouples 132 and 133 which, it will be observed, are connected in series opposition in the input circuit to an amplifier 134. Thus, the amplifier 134 will respond only to a difference in temperature. By reason of a diode 135 in the output circuit, it will only energize a relay 136 when the exterior temperature increases above that of the interior temperature of the roll 130. When this occurs, the relay 136 is energized to close its contacts and hence to complete a circuit for a motor 137 driving a compressor 138 which forces streams of air through the distributing head 139 to produce a cooling effect on the exterior surface of the roll. It will be understood, of course, that the distributing head 139 extends the full length of the roll, thus to provide the needed uniform cooling lengthwise thereof and to assure the maintenance of the lengthwise tangency at the nip. It is to be noted that the external thermocouple 133 is mounted within an enclosure in close juxtaposition with the roll 130. A resistance thermometer may be substituted for thermocouple 133 and the arrangement as a whole may be similar to that shown in U.S. Pat. 2,627,182. Though not as desirable, nevertheless a heater may be inserted into openings in the roll 130 and the relay 136 used to break and make the heater circuit to equalize the internal and external temperatures to avoid the thermally-induced roll-deforming mechanical stresses.

It will be appreciated that, although FIG. 14 shows an optical pyrometer 106 arranged for sensing the surface temperature of the roll 10, whereas FIG. 15 shows a contact thermocouple 133 for the same purpose, various other means may be utilized for sensing this and other temperatures in accordance with this invention. Actually, where shiny surfaces are involved, as is often the case with textile crimping rolls, the shininess of the surface sometimes causes a slight error in the operation of many optical pyrometers. Therefore, in many cases it may be preferable to employ the contact thermocouple such as that appearing in FIG. 15, to the optical pyrometer appearing in FIG. 14.

It is to be understood that further modifications may be made in practicing the method and in the apparatus embodying the present invention, that equivalent elements may be substituted, that parts may be reversed and that certain features discussed in connection with one embodiment may likewise be used with other embodiments, though not explicitly set forth in the above description, which is to be taken as exemplary of the preferred forms of the invention and which are intended to be covered by the appended claims.

The following is claimed:

1. In a method of processing material to be worked by a pair of cooperating rolls, wherein the material is passed into the nip formed between said pair of cooperating rolls the surfaces of which, at the nip, are tangent one to the other lengthwise of the rolls, the method of preventing thermally induced mechanical forces from distorting said rolls by reason of a difference between the internal and external temperatures thereof which comprises supplying heat to said rolls internally thereof, supplying heat to said rolls externally thereof sensing the internal and external temperatures of the rolls, comparing said internal and external temperatures, and varying at least one of said rates of heat supply to maintain at equality said external and internal temperatures of said rolls.

2. In a method of processing materials to be worked by a pair of cooperating rolls such as filaments and films, wherein the material is passed into the nip formed between the pair of cooperating rolls, and wherein the passage of said material through said nip causes a divergence from linearity of said rolls at said nip, the method of correcting said divergence which comprises sensing the temperature on the external surface of one of said rolls, sensing another temperature at a selected internal point spaced internally of said last mentioned roll from said surface, transferring heat externally to said surface comparing said internal and external temperatures by means independent of either of said rolls, and controlling the rate of addition of such external heat to maintain an unvarying relationship between said external and internal temperatures.

3. In a method of processing materials to be worked by a pair of cooperating rolls such as filaments and films, wherein the material passed into the nip formed between the pair of cooperating rolls, and wherein the passage of said material through said nip causes a divergence from linearity of said rolls at said nip, the method of correcting said divergence which comprises sensing the temperature on the external surface of one of said rolls, sensing another temperature at a selected internal point spaced internally of said last mentioned roll from said surface comparing said internal and external temperatures, removing heat externally from said surface by means independent of either of said rolls, and controlling the rate of diminishing of such surface heat to maintain an unvarying relationship between said external and internal temperatures.

References Cited

UNITED STATES PATENTS

| | | | |
|---|---|---|---|
| 1,440,371 | 1/1923 | Britton | 264—175 |
| 2,882,554 | 4/1959 | Heck | 264—175 |
| 3,039,137 | 6/1962 | Smith et al. | 264—175 |
| 3,146,490 | 9/1964 | Cooney | 264—175 |
| 3,022,545 | 2/1962 | Wylde et al. | 264—168 |
| 3,317,978 | 5/1967 | McIntosh et al. | 264—168 |
| 3,358,344 | 12/1967 | Daniel | 264—282 |

DONALD J. ARNOLD, Primary Examiner

U.S. Cl. X.R.

18—2; 264—168, 283

UNITED STATES PATENT OFFICE
CERTIFICATE OF CORRECTION

Patent No. 3,529,045                                         September 15, 1970

Nathan Rosenstein

It is certified that error appears in the above identified patent and that said Letters Patent are hereby corrected as shown below:

In the heading to the printed specification, lines 3 to 5, "assignor to Spunize Company of America, Inc., a corporation of Connecticut" should read -- assignor, by mesne assignments, to Allied Chemical Corporation, New York, N. Y., a corporation of New York --. Column 11, lines 21 and 22, cancel "comparing said internal and external temperatures" and insert the same after "surface," in line 20, same column 11; same column 11, line 28, after "material" insert -- is --.

Signed and sealed this 30th day of March 1971.

(SEAL)
Attest:

EDWARD M. FLETCHER, JR.                                WILLIAM E. SCHUYLER, JR
Attesting Officer                                              Commissioner of Patents